US012719223B2

(12) United States Patent
Chen et al.

(10) Patent No.: US 12,719,223 B2
(45) Date of Patent: Aug. 25, 2026

(54) TONGUE PLATE WITH IMPROVED SIGNAL SHIELDING EFFECT

(71) Applicant: DONGGUAN LUXSHARE TECHNOLOGIES CO., LTD, Dongguan City (CN)

(72) Inventors: Qiongnan Chen, Dongguan City (CN); Cheng Li, Dongguan City (CN); Bin Huang, Dongguan City (CN)

(73) Assignee: DONGGUAN LUXSHARE TECHNOLOGIES CO., LTD, Dongguan City (CN)

( * ) Notice: Subject to any disclaimer, the term of this patent is extended or adjusted under 35 U.S.C. 154(b) by 386 days.

(21) Appl. No.: 18/380,758

(22) Filed: Oct. 17, 2023

(65) Prior Publication Data

US 2025/0087946 A1 Mar. 13, 2025

(30) Foreign Application Priority Data

Sep. 7, 2023 (CN) ......................... 202311157249.9

(51) Int. Cl.
*H01R 13/6597* (2011.01)
*H01R 13/6471* (2011.01)

(52) U.S. Cl.
CPC ..... *H01R 13/6597* (2013.01); *H01R 13/6471* (2013.01)

(58) Field of Classification Search
CPC ............ H01R 13/6597; H01R 13/6471; H01R 13/02; H01R 13/6461; H01R 13/648; H01R 13/6581; H01R 13/6585; H01R 13/6594; H01R 24/60
See application file for complete search history.

(56) References Cited

U.S. PATENT DOCUMENTS 5,369,551 A * 11/1994 Gore .................... H05K 3/3426 361/767
6,487,083 B1 * 11/2002 Kwong .................. H05K 1/183 361/764
6,520,802 B1 * 2/2003 Mitra ................... H01R 12/716 439/541.5
6,933,805 B1 * 8/2005 Norte ....................... H01G 4/38 361/328
9,300,092 B1 * 3/2016 Ray .................... H01R 13/6466
2012/0282807 A1 * 11/2012 Regnier ............. H01R 13/6466 174/250

(Continued)

*Primary Examiner* — Truc T Nguyen

(74) *Attorney, Agent, or Firm* — Birch, Stewart, Kolasch & Birch, LLP

(57) ABSTRACT

A tongue plate includes a number of first conductive pads and a conductive shielding assembly. The conductive pads include a first signal terminal group, a first ground terminal and a second ground terminal. The conductive shielding assembly includes a first conductive shielding plate in contact with the first ground terminal, a second conductive shielding plate in contact with the second ground terminal, and a connecting plate connecting the first conductive shielding plate and the second conductive shielding plate. The first conductive shielding plate, the second conductive shielding plate and the connecting plate jointly form a first conductive shielding cavity. The first signal terminal group is located at a first opening of the first conductive shielding chamber. Such arrangement improves the signal shielding effect of the tongue plate and reduces signal crosstalk.

20 Claims, 12 Drawing Sheets

(56) References Cited

U.S. PATENT DOCUMENTS

| | | | | |
|---|---|---|---|---|
| 2013/0092429 | A1* | 4/2013 | Ellison | H01R 12/523 174/268 |
| 2013/0309906 | A1* | 11/2013 | De Geest | H01R 13/646 439/607.31 |
| 2014/0349496 | A1* | 11/2014 | Zhu | H05K 1/0219 439/108 |
| 2020/0176905 | A1 | 6/2020 | Buck | |
| 2024/0039487 | A1* | 2/2024 | Ohhashi | H03F 1/26 |
| 2024/0222892 | A1* | 7/2024 | Yao | H01R 13/6586 |

* cited by examiner

TONGUE PLATE WITH IMPROVED SIGNAL SHIELDING EFFECT

CROSS-REFERENCE TO RELATED APPLICATION

This patent application claims priority of a Chinese Patent Application No. 202311157249.9, filed on Sep. 7, 2023 and titled "TONGUE PLATE", the entire content of which is incorporated herein by reference.

TECHNICAL FIELD

The present disclosure relates to a tongue plate, which belongs to the technical field of connector components.

BACKGROUND

A connector in the related art includes a tongue plate on which a plurality of metal conductive pads are provided. The plurality of metal conductive pads generally include a plurality of signal conductive pads and a plurality of ground conductive pads.

As the signal transmission quality of the connector continues to improve, there is still room for improvement in the tongue plate in the related art.

SUMMARY

An object of the present disclosure is to provide a tongue plate with better signal shielding effect.

In order to achieve the above object, the present disclosure adopts the following technical solution: a tongue plate, configured to be inserted into a slot of a mating connector, including: a plurality of first conductive pads including a first signal terminal group, a first ground terminal located on one side of the first signal terminal group along a first direction, and a second ground terminal located on another side of the first signal terminal group along the first direction; and a conductive shielding assembly including a first conductive shielding plate in contact with the first ground terminal, a second conductive shielding plate in contact with the second ground terminal, and a connecting plate connecting the first conductive shielding plate and the second conductive shielding plate: the first conductive shielding plate and the second conductive shielding plate respectively extending along a second direction; the first conductive shielding plate, the second conductive shielding plate and the connecting plate jointly forming a U-shaped first conductive shielding cavity; the first signal terminal group being located at a first opening of the first conductive shielding cavity along a third direction: wherein each two of the first direction, the second direction and the third direction are perpendicular to each other.

In order to achieve the above object, the present disclosure adopts the following technical solution: a tongue plate, made of a printed circuit board and configured to be inserted into a mating connector, the tongue plate including: a plurality of first conductive pads including a first signal terminal group, a first ground terminal located on one side of the first signal terminal group along a first direction, and a second ground terminal located on another side of the first signal terminal group along the first direction; and a conductive shielding assembly including a first conductive shielding plate in contact with the first ground terminal, a second conductive shielding plate in contact with the second ground terminal, and a connecting plate connecting the first conductive shielding plate and the second conductive shielding plate; the first conductive shielding plate extending substantially all the way along the first ground terminal so as to be overlapped with a majority length of the first ground terminal along a second direction; the second conductive shielding plate extending substantially all the way along the second ground terminal so as to be overlapped with a majority length of the second ground terminal along the second direction: the first conductive shielding plate, the second conductive shielding plate and the connecting plate jointly forming a first conductive shielding cavity: the first signal terminal group being located at a first opening of the first conductive shielding cavity along a third direction; wherein each two of the first direction, the second direction and the third direction are perpendicular to each other.

Compared with the prior art, the tongue plate of the present disclosure includes the conductive shielding assembly. The conductive shielding assembly includes the first conductive shielding plate in contact with the first ground terminal, the second conductive shielding plate in contact with the second ground terminal, and the connecting plate connecting the first conductive shielding plate and the second conductive shielding plate. The first conductive shielding plate, the second conductive shielding plate and the connecting plate jointly form the first conductive shielding cavity. The first signal terminal group is located at the first opening of the first conductive shielding cavity along the third direction. In this way, the first signal terminal group of the present disclosure can be isolated from other signals under the function of the first conductive shielding cavity, thereby reducing the signal crosstalk and improving the quality of signal transmission.

DETAILED DESCRIPTION

Figure 1:
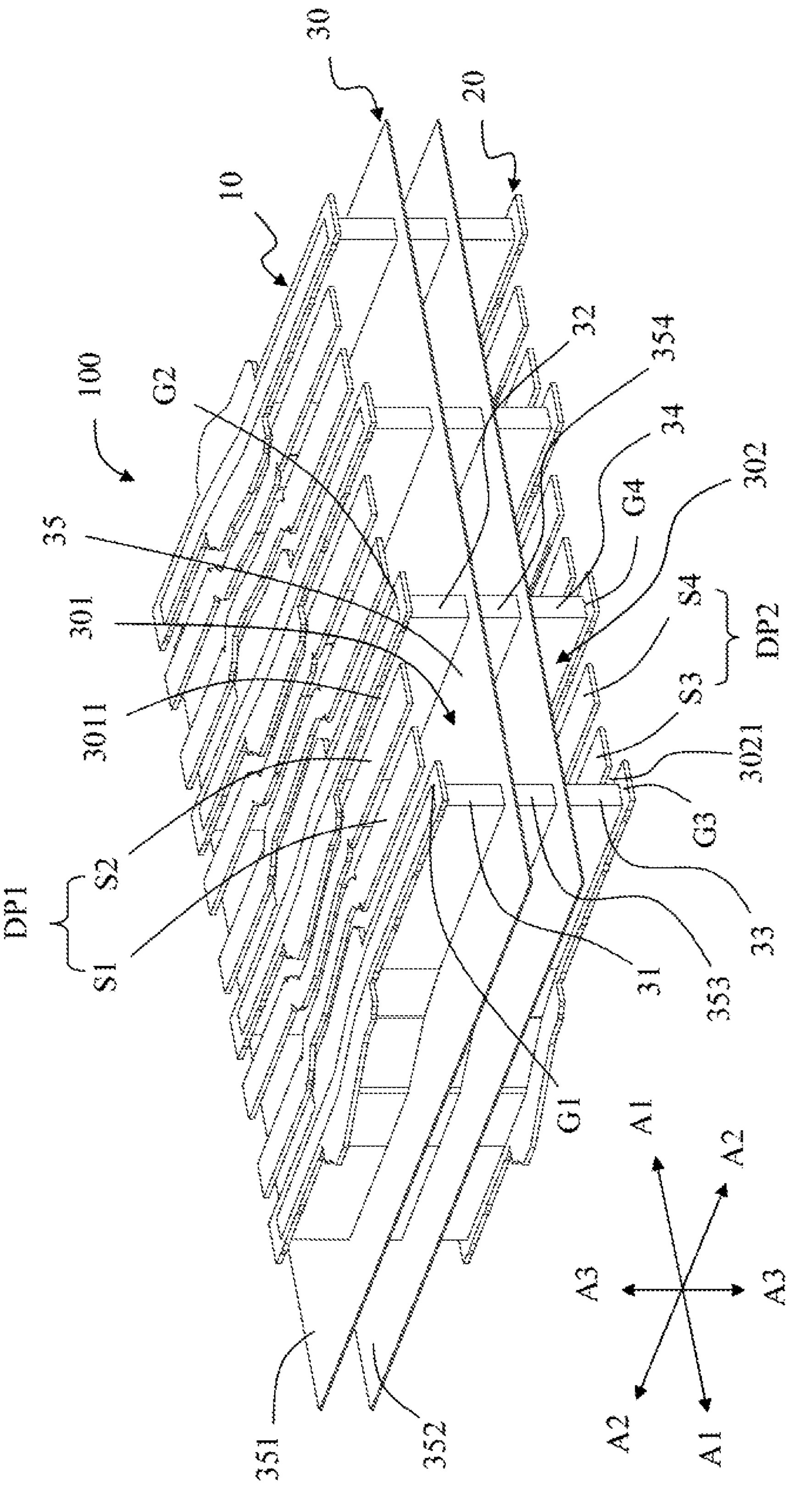
FIG. 1 is a schematic perspective view of a tongue plate in accordance with a first embodiment of the present disclosure.
Figure 2:
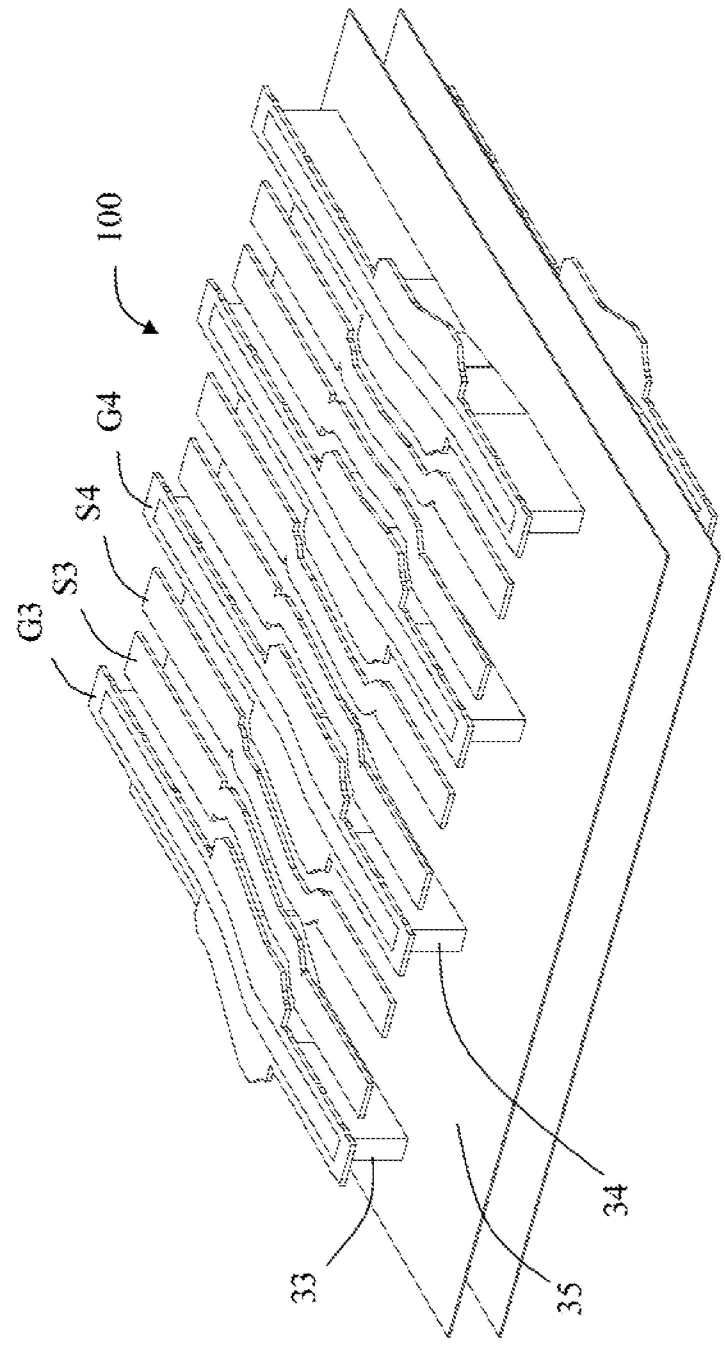
FIG. 2 is a schematic perspective view of FIG. 1 from another angle.
Figure 3:
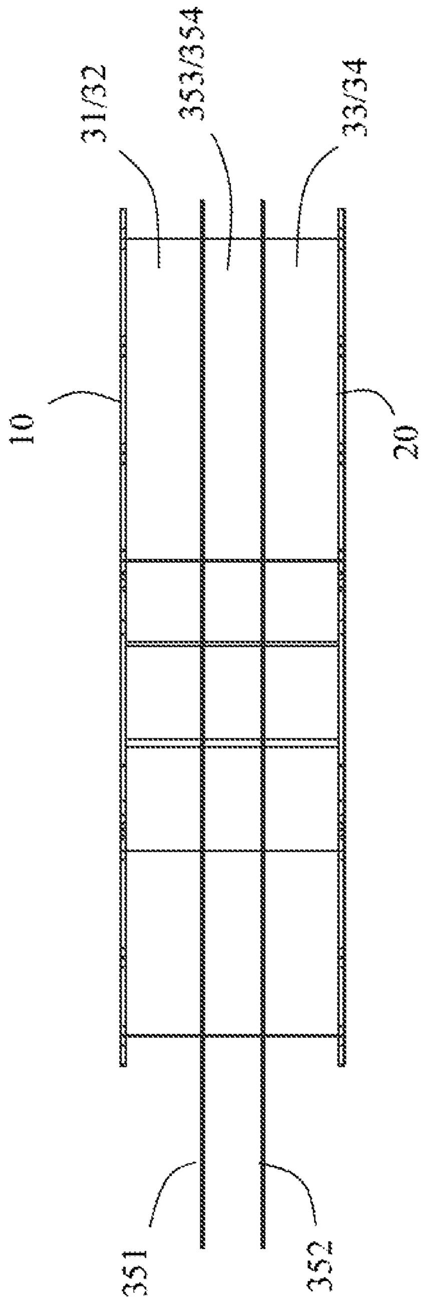
FIG. 3 is a left view of FIG. 1.
Figure 4:
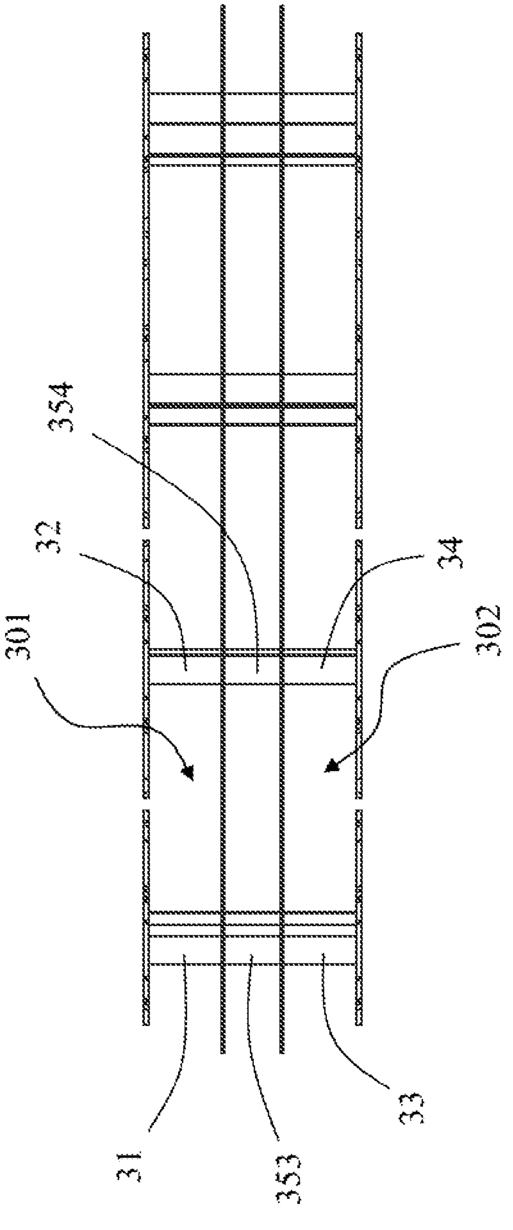
FIG. 4 is a front view of FIG. 1.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 12, the present disclosure discloses a tongue plate 100 which is used as a component of a connector (for example, a plug connector, not shown) for mating with a mating connector (for example, a receptacle connector, not shown). In one embodiment of the present disclosure, the tongue plate 100 is inserted into a slot of the mating connector to realize signal transmission.

In the illustrated embodiment of the present disclosure, the tongue plate 100 includes a plurality of first conductive pads 10, a plurality of second conductive pads 20 and a conductive shielding assembly 30. The plurality of first conductive pads 10 include a plurality of first signal terminal groups DP1, a plurality of first ground terminals G1 and a plurality of second ground terminals G2. In the illustrated embodiment of the present disclosure, each first signal terminal group DP1 includes a first signal terminal S1 and a second signal terminal S2. In order to increase the rate of signal transmission, the first signal terminal S1 and the second signal terminal S2 form a first differential pair. Along a first direction A1-A1 (for example, a left-right direction), one side of each first signal terminal group DP1 is associated with one first ground terminal G1, and the other side of each first signal terminal group DP1 is associated with one second ground terminal G2. In other words, each first signal terminal group DP1 is located between one first ground terminal G1 and one second ground terminal G2 along the first direction A1-A1. The first signal terminal S1, the second signal terminal S2, the first ground terminal G1 and the second ground terminal G2 are located in a same plane.

Figure 5:
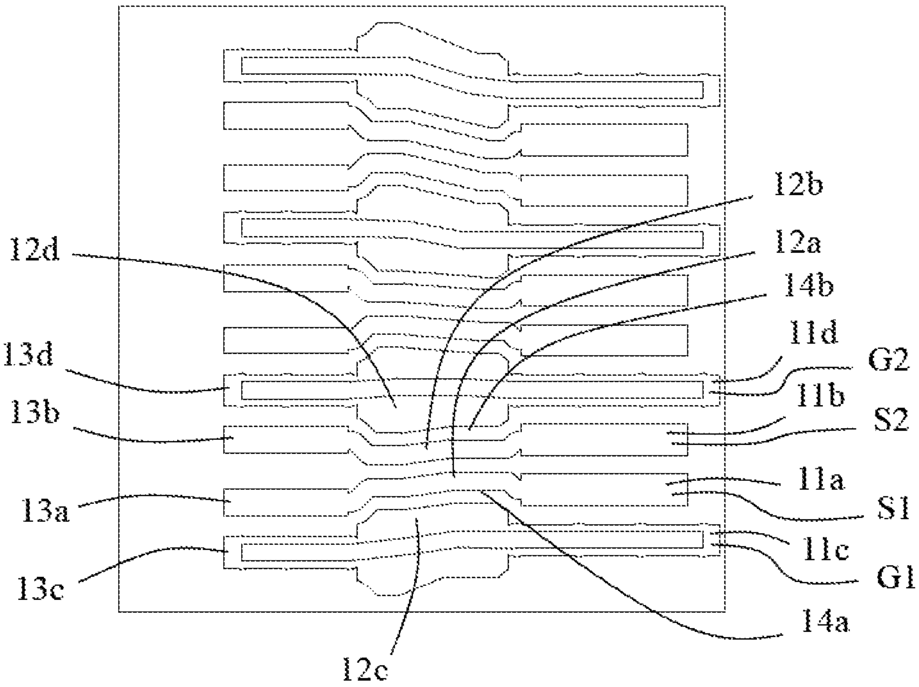
FIG. 5 is a top view of FIG. 1.

Referring to FIG. 5, the first signal terminal S1 includes a first mating portion 11*a*, a first connecting portion 12*a* connected to the first mating portion 11*a*, and a first tail portion 13*a* connected to the first connecting portion 12*a*. The first connecting portion 12*a* is connected between the first mating portion 11*a* and the first tail portion 13*a* along a second direction A2-A2 (for example, a front-rear direction). In the illustrated embodiment of the present disclosure, the first mating portion 11*a* is rectangular in shape and is configured to be in contact with a conductive terminal of the mating connector. The first tail portion 13*a* is also rectangular in shape and is configured to be connected with, for example, a cable (not shown). A centerline of the first mating portion 11*a* and a centerline of the first tail portion 13*a* are staggered along the second direction A2-A2. A width of the first connecting portion 12*a* is less than a width of the first mating portion 11*a*, and also less than a width of the first tail portion 13*a*. The first connecting portion 12*a* is oblique compared to the first mating portion 11*a* and the first tail portion 13*a*.

Similarly, the second signal terminal S2 includes a second mating portion 11*b*, a second connecting portion 12*b* connected to the second mating portion 11*b*, and a second tail portion 13*b* connected to the second connecting portion 12*b*. The second connecting portion 12*b* is connected between the second mating portion 11*b* and the second tail portion 13*b* along the second direction A2-A2. In the illustrated embodiment of the present disclosure, the second mating portion 11*b* is rectangular in shape and is configured to be in contact with a conductive terminal of the mating connector. The second tail portion 13*b* is also rectangular in shape and is configured to be connected with, for example, a cable (not shown). A centerline of the second mating portion 11*b* and a centerline of the second tail portion 13*b* are staggered along the second direction A2-A2. A width of the second connecting portion 12*b* is less than a width of the second mating portion 11*b*, and also less than a width of the second tail portion 13*b*. The second connecting portion 12*b* is oblique compared to the second mating portion 11*b* and the second tail portion 13*b*.

The first ground terminal G1 includes a first contact portion 11*c*, a first connection portion 12*c* connected to the first contact portion 11*c*, and a first tail end portion 13*c* connected to the first connection portion 12*c*. The first connection portion 12*c* is connected between the first contact portion 11*c* and the first tail end portion 13*c* along the second direction A2-A2. In the illustrated embodiment of the present disclosure, the first contact portion 11*c* is rectangular in shape and is configured to be in contact with a conductive terminal of the mating connector. The first tail end portion 13*c* is also rectangular in shape and is configured to be connected with, for example, a cable (not shown). A centerline of the second mating portion 11*b* is staggered or aligned with a centerline of the second tail portion 13*b* along the second direction A2-A2. A width of the first connection portion 12*c* along the first direction A1-A1 is greater than a width of the first contact portion 11*c* along the first direction A1-A1, and also greater than a width of the first tail end portion 13*c* along the first direction A1-A1.

The second ground terminal G2 includes a second contact portion 11*d*, a second connection portion 12*d* connected to the second contact portion 11*d*, and a second tail end portion 13*d* connected to the second connection portion 12*d*. The second connection portion 12*d* is connected between the second contact portion 11*d* and the second tail end portion 13*d* along the second direction A2-A2. In the illustrated embodiment of the present disclosure, the second contact portion 11*d* is rectangular in shape and is configured to be in contact with a conductive terminal of the mating connector. The second tail end portion 13*d* is also rectangular in shape and is configured to be connected with, for example, a cable (not shown). A centerline of the second mating portion 11*b* is staggered or aligned with a centerline of the second tail portion 13*b* along the second direction A2-A2. A width of the second connection portion 12*d* along the first direction A1-A1 is greater than a width of the second contact portion 11*d* along the first direction A1-A1, and also greater than a width of the second tail end portion 13*d* along the first direction A1-A1.

In the illustrated embodiment of the present disclosure, the first contact portion 11*c* of the first ground terminal G1 and the second contact portion 11*d* of the second ground terminal G2 both extend forwardly to protrude beyond a first front end of the first mating portion 11*a* of the first signal terminal S1 and a second front end of the second mating portion 11*b* of the second signal terminal S2, so that the first contact portion 11*c* of the first ground terminal G1 and the second contact portion 11*d* of the second ground terminal G2 are prior to the first mating portion 11*a* of the first signal terminal S1 and the second mating portion 11*b* of the second signal terminal S2 to be in contact with the conductive terminals of the mating connector.

A distance between the centerline of the first tail portion 13*a* of the first signal terminal S1 and the centerline of the second tail portion 13*b* of the second signal terminal S2 is greater than a distance between the centerline of the first mating portion 11*a* of the first signal terminal S1 and the centerline of the second mating portion 11*b* of the second signal terminal S2. Therefore, it is beneficial to better connect the first tail portion 13*a* of the first signal terminal S1 and the second tail portion 13*b* of the second signal terminal S2 with the cables, and avoid mutual interference.

The first connecting portion 12*a* of the first signal terminal S1 protrudes toward the second connecting portion 12*b* of the second signal terminal S2 along the second direction A2-A2, so that a first recess 14*a* is formed on a side of the first connecting portion 12*a* away from the second connecting portion 12*b*. The first connection portion 12*c* of the first ground terminal G1 at least partially protrudes into the first recess 14*a*.

Similarly, the second connecting portion 12*b* of the second signal terminal S2 protrudes toward the first connecting portion 12*a* of the first signal terminal S1 along the second direction A2-A2, so that a second recess 14*b* is formed on a side of the second connecting portion 12*b* away from the first connecting portion 12*a*. The second connection portion 12*d* of the second ground terminal G2 at least partially protrudes into the second recess 14*b*.

In the illustrated embodiment of the present disclosure, each second signal terminal group DP2 includes a third signal terminal S3 and a fourth signal terminal S4. In order to increase the rate of signal transmission, the third signal terminal S3 and the fourth signal terminal S4 form a second differential pair. Along the first direction A1-A1 (for example, the left-right direction), one side of each second signal terminal group DP2 is associated with one third ground terminal G3, and the other side of each second signal terminal group DP2 is associated with one fourth ground terminal G4. In other words, each second signal terminal group DP2 is located between one third ground terminal G3 and one fourth ground terminal G4 along the first direction A1-A1. The third signal terminal S3, the fourth signal terminal S4, the third ground terminal G3 and the fourth ground terminal G4 are located in a same plane.

Figure 6:
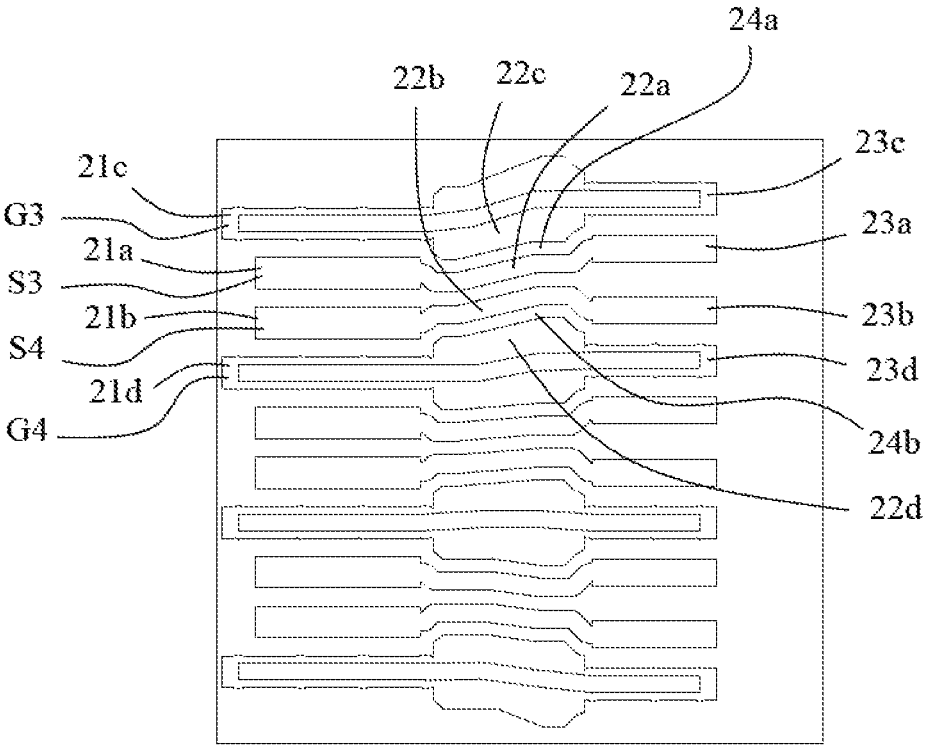
FIG. 6 is a bottom view of FIG. 1.
Figure 7:
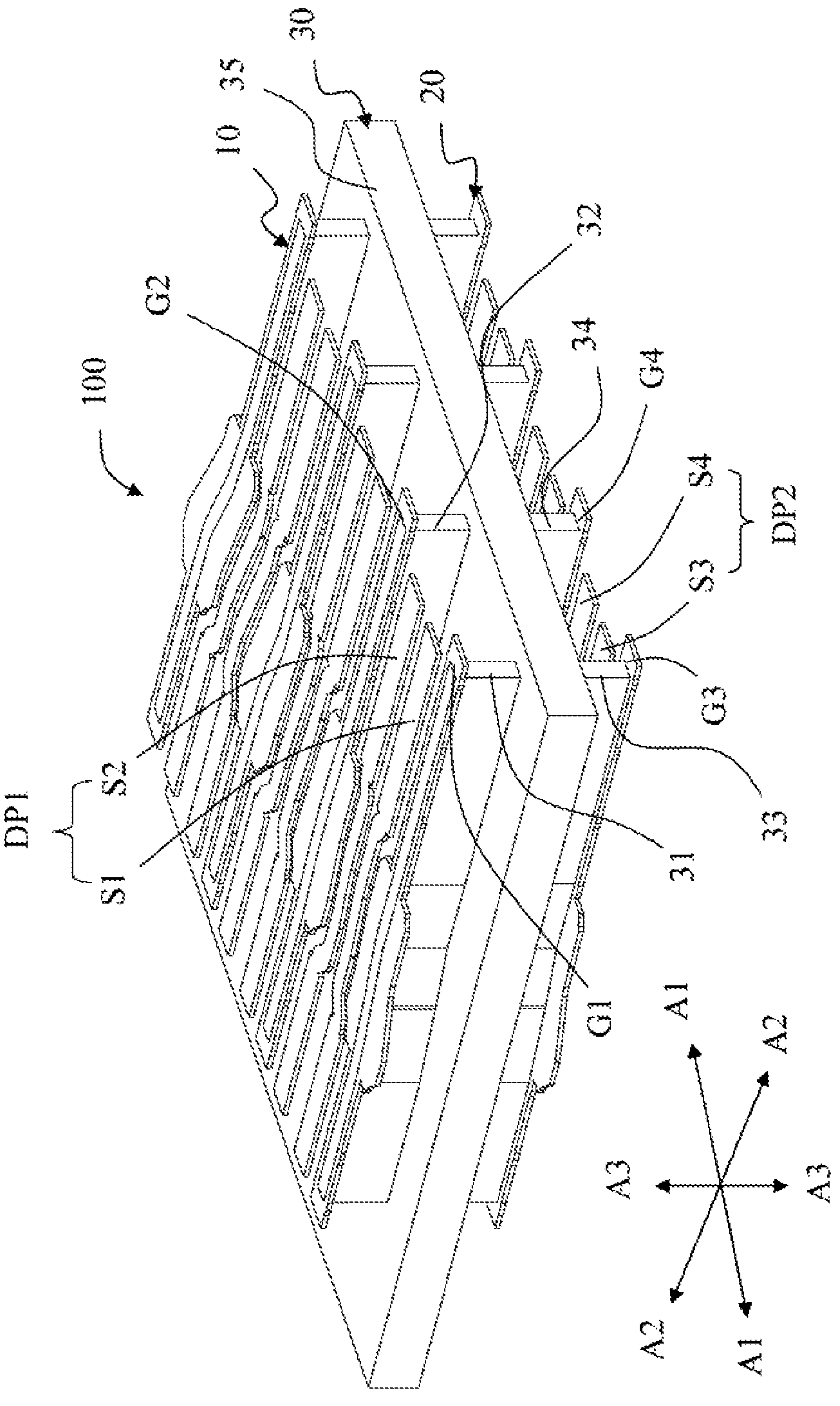
FIG. 7 is a perspective view of the tongue plate in accordance with a second embodiment of the present disclosure.
Figure 8:
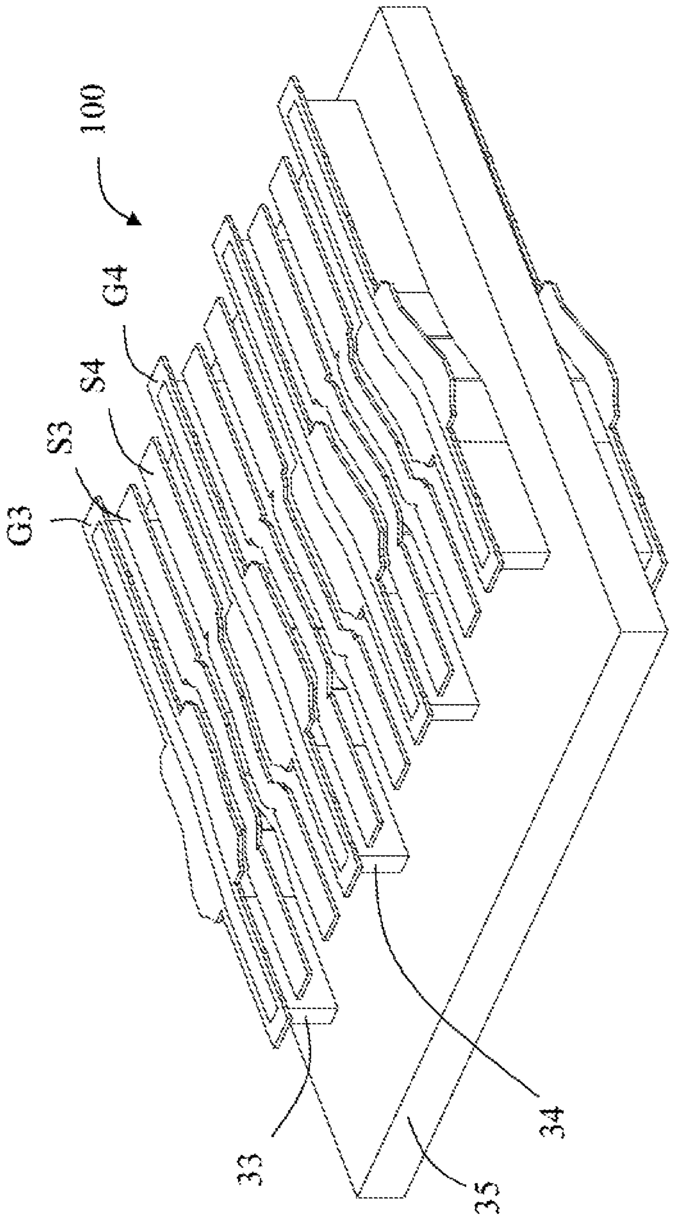
FIG. 8 is a schematic perspective view of FIG. 7 from another angle.
Figure 9:
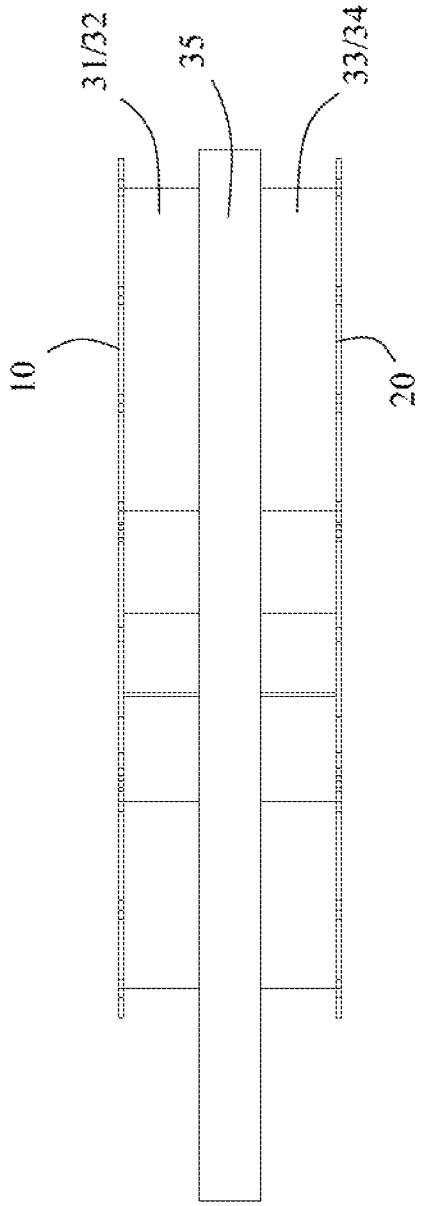
FIG. 9 is a left view of FIG. 7.
Figure 10:
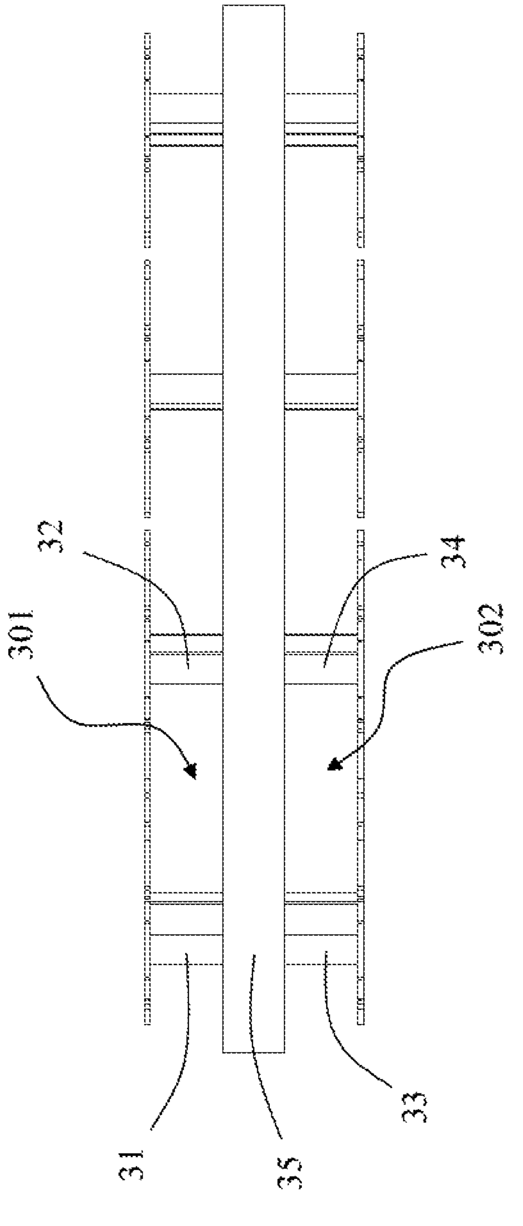
FIG. 10 is a front view of FIG. 7.
Figure 11:
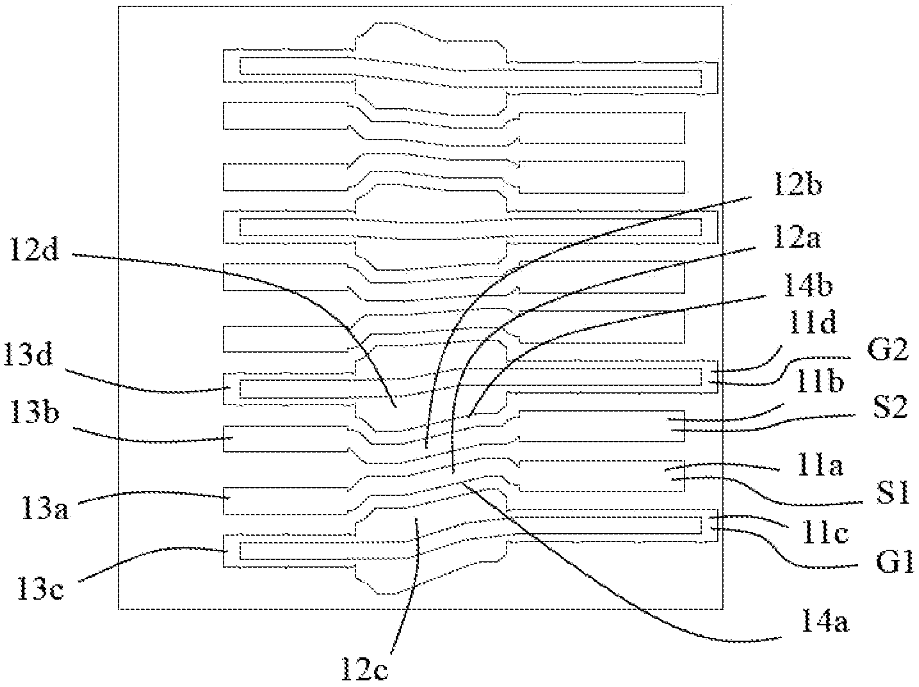
FIG. 11 is a top view of FIG. 7.
Figure 12:
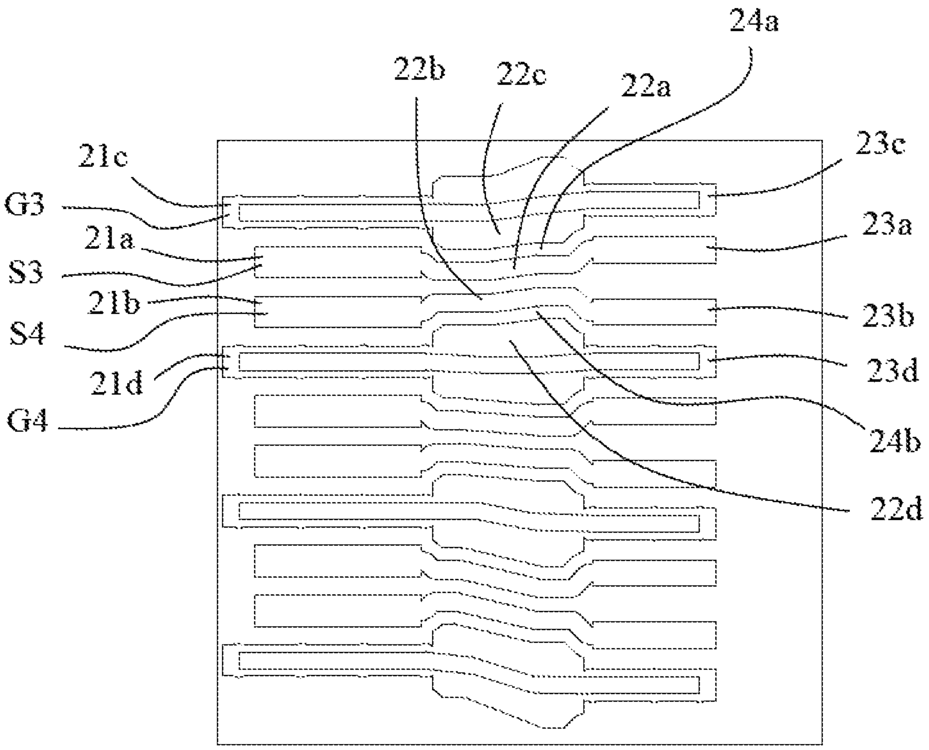
FIG. 12 is a bottom view of FIG. 7.

Referring to FIG. 6, the third signal terminal S3 includes a third mating portion 21*a*, a third connecting portion 22*a* connected to the third mating portion 21*a*, and a third tail portion 23*a* connected to the third connecting portion 22*a*. The third connecting portion 22*a* is connected between the third mating portion 21*a* and the third tail portion 23*a* along the second direction A2-A2 (for example, the front-rear direction). In the illustrated embodiment of the present disclosure, the third mating portion 21*a* is rectangular in shape and is configured to be in contact with a conductive terminal of the mating connector. The third tail portion 23*a* is also rectangular in shape and is configured to be connected with, for example, a cable (not shown). A centerline of the third mating portion 21*a* and a centerline of the third tail portion 23*a* are staggered along the second direction A2-A2. A width of the third connecting portion 22*a* is less than a width of the third mating portion 21*a*, and also less than a width of the third tail portion 23*a*. The third connecting portion 22*a* is oblique compared to the third mating portion 21*a* and the third tail portion 23*a*.

Similarly, the fourth signal terminal S4 includes a fourth mating portion 21*b*, a fourth connecting portion 22*b* connected to the fourth mating portion 21*b*, and a fourth tail portion 23*b* connected to the fourth connecting portion 22*b*. The fourth connecting portion 22*b* is connected between the fourth mating portion 21*b* and the fourth tail portion 23*b* along the second direction A2-A2. In the illustrated embodiment of the present disclosure, the fourth mating portion 21*b* is rectangular in share and is configured to be in contact with a conductive terminal of the mating connector. The fourth tail portion 23*b* is also rectangular in shape and is configured to be connected with, for example, a cable (not shown). A centerline of the fourth mating portion 21*b* and a centerline of the fourth tail portion 23*b* are staggered along the second direction A2-A2. A width of the fourth connecting portion 22*b* is less than a width of the fourth mating portion 21*b*, and also less than a width of the fourth tail portion 23*b*. The fourth connecting portion 22*b* is oblique compared to the fourth mating portion 21*b* and the fourth tail portion 23*b*.

The third ground terminal G3 includes a third contact portion 21*c*, a third connection portion 22*c* connected to the third contact portion 21*c*, and a third tail end portion 23*c* connected to the third connection portion 22*c*. The third connection portion 22*c* is connected between the third contact portion 21*c* and the third tail end portion 23*c* along the second direction A2-A2. In the illustrated embodiment of the present disclosure, the third contact portion 21 *c* is rectangular in shape and is configured to be in contact with a conductive terminal of the mating connector. The third tail end portion 23*c* is also rectangular in shape and is configured to be connected with, for example, a cable (not shown). A centerline of the fourth mating portion 21*b* and a centerline of the fourth tail portion 23*b* are staggered or aligned along the second direction A2-A2. A width of the third connection portion 22*c* along the first direction A1-A1 is greater than a width of the third contact portion 21*c* along the first direction A1-A1, and also greater than a width of the third tail end portion 23*c* along the first direction A1-A1.

The fourth ground terminal G4 includes a fourth contact portion 21*d*, a fourth connection portion 22*d* connected to the fourth contact portion 21*d*, and a fourth tail end portion 23*d* connected to the fourth connection portion 22*d*. The fourth connection portion 22*d* is connected between the fourth contact portion 21*d* and the fourth tail end portion 23*d* along the second direction A2-A2. In the illustrated embodiment of the present disclosure, the fourth contact portion 21*d* is rectangular in shape and is configured to be in contact with a conductive terminal of the mating connector. The fourth tail end portion 23*d* is also rectangular in shape and is configured to be connected with, for example, a cable (not shown). A centerline of the fourth mating portion 21*b* and a centerline of the fourth tail portion 23*b* are staggered or aligned along the second direction A2-A2. A width of the fourth connection portion 22*d* along the first direction A1-A1 is greater than a width of the fourth contact portion 21*d* along the first direction A1-A1, and also greater than a width of the fourth tail end portion 23*d* along the first direction A1-A1.

In the embodiment shown in the present disclosure, the third contact portion 21*c* of the third ground terminal G3 and the fourth contact portion 21*d* of the fourth ground terminal G4 both extend forwardly to protrude beyond a third front end of the third mating portion 21*a* of the third signal terminal S3 and a fourth front end of the fourth mating portion 21*b* of the fourth signal terminal S4, so that the third contact portion 21*c* of the third ground terminal G3 and the fourth contact portion 21*d* of the fourth ground terminal G4 are prior to the third mating portion 21*a* of the third signal terminal S3 and the fourth mating portion 21*b* of the fourth signal terminal S4 to be in contact with the conductive terminals of the mating connector.

A distance between the centerline of the third tail portion 23*a* of the third signal terminal S3 and the centerline of the fourth tail portion 23*b* of the fourth signal terminal S4 is greater than a distance between the centerline of the third mating portion 21*a* of the third signal terminal S3 and the centerline of the fourth mating portion 21*b* of the fourth signal terminal S4. Therefore, it is beneficial to better connect the third tail portion 23*a* of the third signal terminal S3 and the fourth tail portion 23*b* of the fourth signal terminal S4 with the cables, and avoid mutual interference.

The third connecting portion 22*a* of the third signal terminal S3 protrudes toward the fourth connecting portion 22*b* of the fourth signal terminal S4 along the second direction A2-A2, so that a third recess 24*a* is formed on a side of the third connecting portion 22*a* away from the fourth connecting portion 22*b*. The third connection portion 22*c* of the third ground terminal G3 at least partially protrudes into the third recess 24*a*.

Similarly, the fourth connecting portion 22*b* of the fourth signal terminal S4 protrudes toward the third connecting portion 22*a* of the third signal terminal S3 along the second direction A2-A2, so that a fourth recess 24*b* is formed on a side of the fourth connecting portion 22*b* away from the third connecting portion 22*a*. The fourth connection portion 22*d* of the fourth ground terminal G4 at least partially protrudes into the fourth recess 24*b*.

The conductive shielding assembly 30 includes a first conductive shielding plate 31 in contact with the first ground terminal G1, a second conductive shielding plate 32 in contact with the second ground terminal G2, and a connecting plate 35 connecting the first conductive shielding plate 31 and the second conductive shielding plate 32. Each of the first conductive shielding plate 31 and the second conductive shielding plate 32 extends along the second direction A2-A2, and extend for a greater length. In other words, the first conductive shielding plate 31 extends substantially all the way along the first ground terminal G1 so as to be overlapped with a majority length of the first ground terminal G1 along the second direction A2-A2; and the second conductive shielding plate 31 extends substantially all the way along the second ground terminal G1 so as to be overlapped with a majority length of the second ground terminal G1 along the second direction A2-A2. The first conductive shielding plate 31, the second conductive shielding plate 32 and the connecting plate 35 jointly form a U-shaped first conductive shielding cavity 301. The first signal terminal group DP1 is located at a first opening 3011 of the first conductive shielding cavity 301 along a third direction A3-A3 (for example, a vertical direction). Each two of the first direction A1-A1, the second direction A2-A2 and the third direction A3-A3 are perpendicular to each other.

Specifically, in the embodiment shown in the present disclosure, a top surface of the first conductive shielding plate 31 is in contact with a bottom surface of the first contact portion 11*c* of the first ground terminal G1, a bottom surface of the first connection portion 12*c* of the first ground terminal G1 and a bottom surface of the first tail end portion 13*c* of the first ground terminal G1. A bottom surface of the first conductive shielding plate 31 is in contact with a top surface of the connecting plate 35.

In the embodiment shown in the present disclosure, a top surface of the second conductive shielding plate 32 is in contact with a bottom surface of the second contact portion 11*d* of the second ground terminal G2, a bottom surface of the second connection portion 12*d* of the second ground terminal G2, and a bottom surface of the second tail end portion 13*d* of the second ground terminal G2. A bottom surface of the second conductive shielding plate 32 is in contact with the top surface of the connecting plate 35.

Similarly, the conductive shielding assembly 30 includes a third conductive shielding plate 33 in contact with the third ground terminal G3 and a fourth conductive shielding plate 34 in contact with the fourth ground terminal G4. The connecting plate 35 connects the third conductive shielding plate 33 and the fourth conductive shielding plate 34. The third conductive shielding plate 33 and the fourth conductive shielding plate 34 respectively extend along the second direction A2-A2, and extend for a greater length. The third conductive shielding plate 33, the fourth conductive shielding plate 34 and the connecting plate 35 jointly form a U-shaped second conductive shielding cavity 302. The second signal terminal group DP2 is located at the second opening 3021 of the second conductive shielding cavity 302 along the third direction A3-A3.

In the embodiment shown in the present disclosure, a bottom surface of the third conductive shielding plate 33 is in contact with a top surface of the third contact portion 21*c* of the third ground terminal G3, a top surface of the third connection portion 22*c* of the third ground terminal G3 and a top surface of the third tail end portion 23*c* of the third ground terminal G3. A top surface of the third conductive shielding plate 33 is in contact with a bottom surface of the connecting plate 35.

In the embodiment shown in the present disclosure, a bottom surface of the fourth conductive shielding plate 34 is in contact with a top surface of the fourth contact portion 21*d* of the fourth ground terminal G4, a top surface of the fourth connection portion 22*d* of the fourth ground terminal G4 and a top surface of the fourth tail end portion 23*d* of the fourth ground terminal G4. A top surface of the fourth conductive shielding plate 34 is in contact with the bottom surface of the connecting plate 35.

In the illustrated embodiment of the present disclosure, the plurality of first conductive pads 10, the first conductive shielding plate 31 and the second conductive shielding plate 32 are located on one side (for example, an upper side) of the connecting plate 35 along the third direction A3-A3. The plurality of second conductive pads 20, the third conductive shielding plate 33 and the fourth conductive shielding plate 34 are located on another side (for example, a lower side) of the connecting plate 35 along the third direction A3-A3.

Referring to FIG. 1 to FIG. 6, in the first embodiment of the present disclosure, the connecting plate 35 includes a first plate 351, a second plate 352 spaced apart from the first plate 351, a first intermediate plate 353 located between the first plate 351 and the second plate 352 and connecting the first plate 351 and the second plate 352, and a second intermediate plate 354 located between the first plate 351 and the second plate 352 and connecting the first plate 351 and the second plate 352. The first plate 351 and the second plate 352 are disposed at intervals along the third direction A3-A3. The first intermediate plate 353 and the second intermediate plate 354 respectively extend along the second direction A2-A2. The first intermediate plate 353 and the second intermediate plate 354 are disposed at intervals along the first direction A1-A1.

In the illustrated embodiment of the present disclosure, the first conductive shielding plate 31, the first intermediate plate 353 and the third conductive shielding plate 33 are sequentially disposed along the third direction A3-A3 and aligned with each other. The second conductive shielding plate 32, the second intermediate plate 354 and the fourth conductive shielding plate 34 are sequentially disposed along the third direction A3-A3 and aligned with each other.

In the illustrated embodiment of the present disclosure, the plurality of first conductive pads 10 and the plurality of second conductive pads 20 are aligned in a one-to-one corresponding manner along the third direction A3-A3. The first conductive pads 10 and the second conductive pads 20 at aligned positions are the same.

Referring to FIG. 7 to FIG. 12, in the second embodiment of the present disclosure, the connecting plate 35 is an integral plate.

It is understandable to those skilled in the art that the material of the conductive shielding assembly 30 is metal or conductive plastic, or a composite in which an inner core is plastic but the inner core is covered with metal.

In one embodiment of the present disclosure, the tongue plate 100 is a printed circuit board.

Compared with the prior art, the tongue plate 100 of the present disclosure includes the conductive shielding assembly 30. The conductive shielding assembly 30 includes the first conductive shielding plate 31 in contact with the first ground terminal G1, the second conductive shielding plate 32 in contact with the second ground terminal G2, and the connecting plate 35 connecting the first conductive shielding plate 31 and the second conductive shielding plate 32. The first conductive shielding plate 31, the second conductive shielding plate 32 and the connecting plate 35 jointly form the U-shaped first conductive shielding cavity 301. The first signal terminal group DP1 is located at the first opening 3011 of the first conductive shielding cavity 301 along the third direction A3-A3. In this way, the first signal terminal group DP1 of the present disclosure can be isolated from other signals under the function of the first conductive shielding cavity 301. As a result, signal crosstalk is reduced, and the quality of signal transmission is improved.

Besides, the conductive shielding assembly 30 includes the third conductive shielding plate 33 in contact with the third ground terminal G3 and the fourth conductive shielding plate 34 is in contact with the fourth ground terminal G4. The connecting plate 35 connects the third conductive shielding plate 33 and the fourth conductive shielding plate 34. The third conductive shielding plate 33, the fourth conductive shielding plate 34 and the connecting plate 35 jointly form the U-shaped second conductive shielding cavity 302. The second signal terminal group DP2 is located at the second opening 3021 of the second conductive shielding cavity 302 along the third direction A3-A3. In this way, the second signal terminal group DP2 of the present disclosure can be isolated from other signals under the action of the second conductive shielding cavity 302. As a result, the signal crosstalk is further reduced, and the quality of signal transmission is further improved.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A tongue plate, configured to be inserted into a slot of a mating connector, comprising:

a plurality of first conductive pads comprising a first signal terminal group, a first ground terminal located on one side of the first signal terminal group along a first direction, and a second ground terminal located on another side of the first signal terminal group along the first direction; and a conductive shielding assembly comprising a first conductive shielding plate in contact with the first ground terminal, a second conductive shielding plate in contact with the second ground terminal, and a connecting plate connecting the first conductive shielding plate and the second conductive shielding plate; the first conductive shielding plate and the second conductive shielding plate respectively extending along a second direction; the first conductive shielding plate, the second conductive shielding plate and the connecting plate jointly forming a U-shaped first conductive shielding cavity; the first signal terminal group being located at a first opening of the first conductive shielding cavity along a third direction;

wherein the connecting plate comprises a first plate, a second plate spaced apart from the first plate, a first intermediate plate located between the first plate and the second plate and connecting the first plate and the second plate, and a second intermediate plate located between the first plate and the second plate and connecting the first plate and the second plate; the first plate and the second plate are disposed at intervals along the third direction; the first intermediate plate and the second intermediate plate respectively extend along the second direction; the first intermediate plate and the second intermediate plate are disposed at intervals along the first direction.

2. The tongue plate according to claim 1, further comprising a plurality of second conductive pads which comprise a second signal terminal group, a third ground terminal located on one side of the second signal terminal group along the first direction, and a fourth ground terminal located on another side of the second signal terminal group along the first direction;

wherein the conductive shielding assembly comprises a third conductive shielding plate in contact with the third ground terminal and a fourth conductive shielding plate in contact with the fourth ground terminal; the connecting plate connects the third conductive shielding plate and the fourth conductive shielding plate; the third conductive shielding plate and the fourth conductive shielding plate respectively extend along the second direction; the third conductive shielding plate, the fourth conductive shielding plate and the connecting plate jointly form a U-shaped second conductive shielding cavity; the second signal terminal group is located at a second opening of the second conductive shielding cavity along the third direction.

3. The tongue plate according to claim 2, wherein the plurality of first conductive pads, the first conductive shielding plate and the second conductive shielding plate are located on one side of the connecting plate along the third direction;

the plurality of second conductive pads, the third conductive shielding plate and the fourth conductive shielding plate are located on another side of the connecting plate along the third direction.

4. The tongue plate according to claim 1, wherein the first conductive shielding plate, the first intermediate plate and the third conductive shielding plate are sequentially disposed along the third direction and aligned with each other;

the second conductive shielding plate, the second intermediate plate and the fourth conductive shielding plate are sequentially disposed along the third direction and aligned with each other.

5. The tongue plate according to claim 1, wherein the connecting plate is an integral plate.

6. The tongue plate according to claim 2, wherein the first signal terminal group comprises a first signal terminal and a second signal terminal; the first signal terminal and the second signal terminal form a first differential pair; the first signal terminal, the second signal terminal, the first ground terminal and the second ground terminal are located in a same plane.

7. The tongue plate according to claim 6, wherein the first signal terminal comprises a first mating portion and a first connecting portion connected to the first mating portion;

the second signal terminal comprises a second mating portion and a second connecting portion connected to the second mating portion;

the first ground terminal comprises a first contact portion and a first connection portion connected to the first contact portion;

the second ground terminal comprises a second contact portion and a second connection portion connected to the second contact portion;

both the first contact portion and the second contact portion extend forwardly to protrude beyond a first front end of the first mating portion and a second front end of the second mating portion;

the first connecting portion protrudes toward the second connecting portion along the second direction, so that a first recess is formed on a side of the first connecting portion away from the second connecting portion; the first connection portion at least partially protrudes into the first recess;

the second connecting portion protrudes toward the first connecting portion along the second direction, so that a second recess is formed on a side of the second connecting portion away from the first connecting portion; the second connection portion at least partially protrudes into the second recess.

8. The tongue plate according to claim 7, wherein the second signal terminal group comprises a third signal terminal and a fourth signal terminal; the third signal terminal and the fourth signal terminal form a second differential pair; the third signal terminal, the fourth signal terminal, the third ground terminal and the fourth ground terminal are located in a same plane.

9. The tongue plate according to claim 8, wherein the third signal terminal comprises a third mating portion and a third connecting portion connected to the third mating portion;

the fourth signal terminal comprises a fourth mating portion and a fourth connecting portion connected to the fourth mating portion;

the third ground terminal comprises a third contact portion and a third connection portion connected to the third contact portion;

the fourth ground terminal comprises a fourth contact portion and a fourth connection portion connected to the fourth contact portion;

the third contact portion and the fourth contact portion extend forwardly to protrude beyond a third front end of the third mating portion and a fourth front end of the fourth mating portion;

the third connecting portion protrudes toward the fourth connecting portion along the second direction, so that a third recess is formed on a side of the third connecting portion away from the fourth connecting portion; the third connection portion at least partially protrudes into the third recess;

the fourth connecting portion protrudes toward the third connecting portion along the second direction, so that a fourth recess is formed on a side of the fourth connecting portion away from the third connecting portion; the fourth connection portion at least partially protrudes into the fourth recess.

10. The tongue plate according to claim 9, wherein a width of the first connection portion of the first ground terminal along the first direction is greater than a width of the first contact portion of the first ground terminal along the first direction;

a width of the second connection portion of the second ground terminal along the first direction is greater than a width of the second contact portion of the second ground terminal along the first direction;

a width of the third connection portion of the third ground terminal along the first direction is greater than a width of the third contact portion of the third ground terminal along the first direction;

a width of the fourth connection portion of the fourth ground terminal along the first direction is greater than a width of the fourth contact portion of the fourth ground terminal along the first direction.

11. The tongue plate according to claim 1, wherein a material of the conductive shielding assembly is metal or conductive plastic, or a composite in which an inner core is plastic but the inner core is covered with metal.

12. The tongue plate according to claim 1, wherein the tongue plate is a printed circuit board.

13. A tongue plate, made of a printed circuit board and configured to be inserted into a mating connector, the tongue plate comprising:

a plurality of first conductive pads comprising a first signal terminal group, a first ground terminal located on one side of the first signal terminal group along a first direction, and a second ground terminal located on another side of the first signal terminal group along the first direction; and a conductive shielding assembly comprising a first conductive shielding plate in contact with the first ground terminal, a second conductive shielding plate in contact with the second ground terminal, and a connecting plate connecting the first conductive shielding plate and the second conductive shielding plate; the first conductive shielding plate extending substantially all the way along the first ground terminal so as to be overlapped with a majority length of the first ground terminal along a second direction; the second conductive shielding plate extending substantially all the way along the second ground terminal so as to be overlapped with a majority length of the second ground terminal along the second direction; the first conductive shielding plate, the second conductive shielding plate and the connecting plate jointly forming a first conductive shielding cavity; the first signal terminal group being located at a first opening of the first conductive shielding cavity along a third direction;

wherein each two of the first direction, the second direction and the third direction are perpendicular to each other.

14. The tongue plate according to claim 13, further comprising a plurality of second conductive pads which comprise a second signal terminal group, a third ground terminal located on one side of the second signal terminal group along the first direction, and a fourth ground terminal located on another side of the second signal terminal group along the first direction;

wherein the conductive shielding assembly comprises a third conductive shielding plate in contact with the third ground terminal and a fourth conductive shielding plate in contact with the fourth ground terminal; the connecting plate connects the third conductive shielding plate and the fourth conductive shielding plate; the third conductive shielding plate and the fourth conductive shielding plate respectively extend along the second direction; the third conductive shielding plate, the fourth conductive shielding plate and the connecting plate jointly form a second conductive shielding cavity; the second signal terminal group is located at a second opening of the second conductive shielding cavity along the third direction.

15. The tongue plate according to claim 14, wherein the plurality of first conductive pads, the first conductive shielding plate and the second conductive shielding plate are located on one side of the connecting plate along the third direction;

the plurality of second conductive pads, the third conductive shielding plate and the fourth conductive shielding plate are located on another side of the connecting plate along the third direction.

16. The tongue plate according to claim 14, wherein the connecting plate comprises a first plate, a second plate spaced apart from the first plate, a first intermediate plate located between the first plate and the second plate and connecting the first plate and the second plate, and a second intermediate plate located between the first plate and the second plate and connecting the first plate and the second plate; the first plate and the second plate are disposed at intervals along the third direction; the first intermediate plate and the second intermediate plate respectively extend along the second direction; the first intermediate plate and the second intermediate plate are disposed at intervals along the first direction.

17. The tongue plate according to claim 16, wherein the first conductive shielding plate, the first intermediate plate and the third conductive shielding plate are sequentially disposed along the third direction and aligned with each other;

the second conductive shielding plate, the second intermediate plate and the fourth conductive shielding plate are sequentially disposed along the third direction and aligned with each other.

18. The tongue plate according to claim 13, wherein the connecting plate is an integral plate.

19. The tongue plate according to claim 13, wherein a material of the conductive shielding assembly is metal or conductive plastic, or a composite in which an inner core is plastic but the inner core is covered with metal.

20. A tongue plate, configured to be inserted into a slot of a mating connector, comprising:

a plurality of first conductive pads comprising a first signal terminal group, a first ground terminal located on one side of the first signal terminal group along a first direction, and a second ground terminal located on another side of the first signal terminal group along the first direction; and a conductive shielding assembly comprising a first conductive shielding plate in contact with the first ground terminal, a second conductive shielding plate in contact with the second ground terminal, and a connecting plate connecting the first conductive shielding plate and the second conductive shielding plate; the first conductive shielding plate and the second conductive shielding plate respectively extending along a second direction; the first conductive shielding plate, the second conductive shielding plate and the connecting plate jointly forming a U-shaped first conductive shielding cavity; the first signal terminal group being located at a first opening of the first conductive shielding cavity along a third direction;

wherein the first signal terminal group comprises a first signal terminal and a second signal terminal;

wherein the first signal terminal comprises a first mating portion and a first connecting portion connected to the first mating portion;

the second signal terminal comprises a second mating portion and a second connecting portion connected to the second mating portion;

the first ground terminal comprises a first contact portion and a first connection portion connected to the first contact portion;

the second ground terminal comprises a second contact portion and a second connection portion connected to the second contact portion;

both the first contact portion and the second contact portion extend forwardly to protrude beyond a first front end of the first mating portion and a second front end of the second mating portion;

the first connecting portion protrudes toward the second connecting portion along the second direction, so that a first recess is formed on a side of the first connecting portion away from the second connecting portion; the first connection portion at least partially protrudes into the first recess;

the second connecting portion protrudes toward the first connecting portion along the second direction, so that a second recess is formed on a side of the second connecting portion away from the first connecting portion; the second connection portion at least partially protrudes into the second recess.

* * * * *